(12) United States Patent
Itano et al.

(10) Patent No.: US 8,457,818 B2
(45) Date of Patent: Jun. 4, 2013

(54) TRAIN SLIDE CONTROL DEVICE AND TRAIN SLIDE CONTROL METHOD

(75) Inventors: Yasuharu Itano, Chiyoda-ku (JP);
Hiroshi Yamada, Chiyoda-ku (JP);
Etsuji Matsuyama, Chiyoda-ku (JP)

(73) Assignee: Mitsubishi Electric Corporation, Chiyoda-Ku, Tokyo (JP)

( * ) Notice: Subject to any disclaimer, the term of this patent is extended or adjusted under 35 U.S.C. 154(b) by 273 days.

(21) Appl. No.: 12/937,124

(22) PCT Filed: May 8, 2009

(86) PCT No.: PCT/JP2009/058700
§ 371 (c)(1),
(2), (4) Date: Oct. 8, 2010

(87) PCT Pub. No.: WO2009/154048
PCT Pub. Date: Dec. 23, 2009

(65) Prior Publication Data
US 2011/0029167 A1    Feb. 3, 2011

(30) Foreign Application Priority Data

Jun. 20, 2008    (WO) .................. PCT/JP2008/061336

(51) Int. Cl.
*B60T 8/1766*    (2006.01)
*B61H 13/30*    (2006.01)
(52) U.S. Cl.
USPC ................ 701/20; 701/78; 701/79; 303/22.6; 303/128
(58) Field of Classification Search
None
See application file for complete search history.

(56) References Cited

U.S. PATENT DOCUMENTS

| 4,316,640 | A | * | 2/1982 | Cripe | ............................... 303/20 |
| 5,654,889 | A | * | 8/1997 | Wood et al. | ..................... 701/71 |
| 2002/0088673 | A1 | * | 7/2002 | Malac | ..................... 188/1.11 R |

FOREIGN PATENT DOCUMENTS

| DE | 2625962 | * 12/1977 |
| JP | 60-045454 A | 3/1985 |
| JP | 63-008061 | 1/1988 |
| JP | 05-319243 | 12/1993 |
| JP | 06-054406 | 2/1994 |

(Continued)

OTHER PUBLICATIONS

Office Action dated Mar. 1, 2011, issued in the corresponding Japanese Patent Application No. 2010-517813, and an English Translation thereof.

(Continued)

*Primary Examiner* — Michael J Zanelli
(74) *Attorney, Agent, or Firm* — Buchanan Ingersoll & Rooney PC (57) ABSTRACT

A train slide control device and a train slide control method capable of further improving the precision of slide control are achieved. The train slide control device comprises: an electromagnetic valve unit; a relay valve that outputs a pressure of the brake cylinder; and a slide controller that includes: a velocity-difference detecting unit that detects a velocity difference of each wheel based on a velocity signal; a deceleration calculating unit that calculates a deceleration of a train based on the velocity signal; a sliding-amount determining unit that determines a sliding-amount of each wheel based on the velocity difference and deceleration; and a brake-cylinder-pressure calculating unit that calculates a pressure control signal for controlling a pressure of the brake cylinder based on:
the sliding-amount; a brake command for obtaining a predetermined deceleration; and a signal that indicates the pressure of the compressed air and a pressure of the brake cylinder.

14 Claims, 4 Drawing Sheets

FOREIGN PATENT DOCUMENTS

| | | | |
|---|---|---|---|
| JP | 6-54406 | * | 2/1994 |
| JP | 7-096826 | A | 4/1995 |
| JP | 8-214407 | A | 8/1996 |
| JP | 10-217929 | | 8/1998 |
| JP | 11-235972 | A | 8/1999 |
| JP | 2000-211487 | A | 8/2000 |
| JP | 2001-219839 | A | 8/2001 |
| JP | 2003-063366 | | 3/2003 |
| JP | 2004-306865 | A | 11/2004 |
| JP | 2004-336958 | | 11/2004 |

OTHER PUBLICATIONS

Office Action (Decision of a Patent Grant) dated Jun. 28, 2011, issued in the corresponding Japanese Patent Application No. 2010-517813, and an English Translation thereof.

International Search Report (PCT/ISA/210) issued on Aug. 18, 2009, by Japanese Patent Office as the International Searching Authority for International Application No. PCT/JP2009/058700.

Written Opinion (PCT/ISA/237) issued on Aug. 18, 2009, by Japanese Patent Office as the International Searching Authority for International Application No. PCT/JP2009/058700.

Office Action from Chinese Patent Office dated Jan. 14, 2013, issued in corresponding Chinese Patent Application No. 200980118460.1, and English translation thereof.

* cited by examiner

| NUMBER OF SLIDES | FIRST TIME | SECOND TIME | THIRD TIME |
|---|---|---|---|
| BC PRESSURE REDUCTION RATE | 20% | 30% | 40% |

FIG.5

TRAIN SLIDE CONTROL DEVICE AND TRAIN SLIDE CONTROL METHOD

TECHNICAL FIELD

The present invention relates to a train slide control device and a train slide control method that detect a slide of a wheel while a brake is operated to control a brake force.

BACKGROUND ART

Conventionally, for example, a train slide control device described in Patent Document 1 is configured such that a velocity sensor detects the number of revolutions of each wheel, and when a difference is generated between the number of revolutions of one wheel and the number of revolutions of other wheels while a brake is operated, compressed air supplied to a brake cylinder of a sliding wheel is exhausted or supplied to increase or decrease a brake cylinder pressure for preventing a slide. The brake cylinder pressure is provided by amplifying compressed air outputted according to opening and closing operations of electromagnetic valves for regular use brake control and slide control (hereinafter, "electromagnetic valve unit") by a relay valve.

Patent Document 1: Japanese Patent Application Laid-open No. 2004-306865

DISCLOSURE OF INVENTION

Problem to be Solved by the Invention

However, according to the train slide control device described in Patent Document 1, a volume of compressed air is large in the relay valve and thus hunting (an unstable state because of a control amount varying near a target value) occurs. Accordingly, the state of the brake cylinder pressure cannot be utilized for slide control. Therefore, slide control considering a variation in the brake cylinder pressure cannot be performed and thus further improvement in the precision of slide control is difficult.

The present invention has been achieved in view of the above circumstances, and an object of the present invention is to provide a train slide control device and a train slide control method capable of further improving the precision of slide control.

Means for Solving Problem

To solve the above problems and achieve the object, a train slide control device includes: an electromagnetic valve unit having a supply valve that supplies supplied compressed air to a brake cylinder and an exhaust valve that adjusts a pressure of the supplied compressed air; a relay valve that outputs a pressure of the brake cylinder according to the compressed air supplied from the electromagnetic valve unit; and a slide controller that includes: a velocity-difference detecting unit configured to detect a velocity difference of each wheel based on a velocity signal; a deceleration calculating unit configured to calculate a deceleration of a train based on the velocity signal; a sliding-amount determining unit configured to determine a sliding-amount of each wheel based on the velocity difference and deceleration; and a brake-cylinder-pressure calculating unit configured to calculate a pressure control signal for controlling a pressure of the brake cylinder based on: the sliding-amount; a brake command for obtaining a predetermined deceleration; and a signal that indicates the pressure of the compressed air and pressure of the brake cylinder.

According to the present invention, the precision of slide control can be further improved.

EXPLANATIONS OF LETTERS OR NUMERALS 1, 1a, 1b, 1c, 1d Velocity sensor
1D Velocity signal
2 Velocity input unit
3 Velocity-difference detecting unit
3D Velocity difference
4 Deceleration calculating unit
4D Deceleration
5 Sliding-amount determining unit
5D Sliding amount
6 Brake-cylinder-pressure calculating unit
7 Output unit
8 Electromagnetic valve unit for regular use brake control and slide control
8D Pressure control signal
9 Relay valve
9D Signal indicating brake cylinder pressure
10 Brake cylinder
11, 16 Pressure sensor
11D, 16D Feedback command
12 Brake command unit
12D Brake command
13 Load compensating unit
13D Load compensation signal
14 Brake shoe
15 Wheel
17 Deceleration sensor
17D Deceleration sensor output
20 BC-pressure reduction-rate pattern
30 BC-pressure reduction-rate table
100 Slide control unit
200 Train slide control device
F Brake force

BEST MODE(S) FOR CARRYING OUT THE INVENTION

Exemplary embodiments of a train slide control device according to the present invention will be explained below in detail with reference to the accompanying drawings. The present invention is not limited to the embodiments.

First Embodiment

Figure 1:
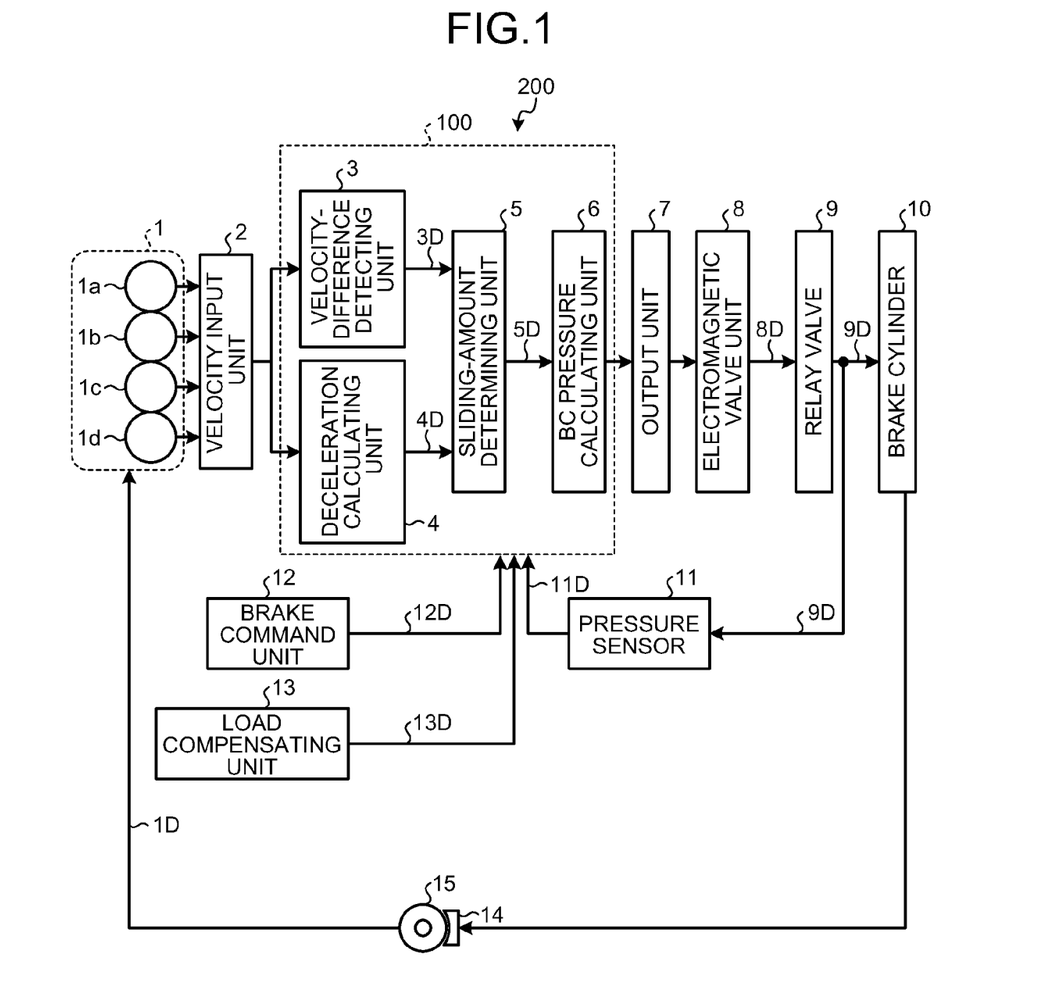
FIG. 1 is an example of a configuration of a train slide control device according to a first embodiment.

FIG. 1 is an example of a configuration of a train slide control device according to a first embodiment. A train slide control device 200 shown in FIG. 1 includes, as its main constituent elements, a velocity sensor 1, a slide control unit 100, an output unit 7, an electromagnetic valve unit 8 for regular use brake control and slide control (hereinafter, "electromagnetic valve unit"), a relay valve 9, a brake cylinder 10, a pressure sensor 11, a brake command unit 12, a load compensating unit 13, a brake shoe 14, and a wheel 15.

The velocity sensor 1 is arranged at front and rear carriages of each vehicle (four in total) and fetches a velocity signal 1D of each wheel 15. A velocity input unit 2 fetches the velocity signal 1D from velocity sensors 1a to 1d of each vehicle.

The slide control unit 100 includes the velocity input unit 2, a velocity-difference detecting unit 3, a deceleration calculating unit 4, a sliding-amount determining unit 5, and a brake-cylinder-pressure (BC pressure) calculating unit 6. The velocity-difference detecting unit 3 detects a velocity difference 3D between the wheel 15 that is not sliding and another wheel 15 that is sliding. The deceleration calculating unit 4 differentiates the velocity signal 1D received from the velocity sensors 1a to 1d to detect deceleration 4D of a train. The deceleration calculating unit 4 may be an embodiment of being capable of detecting both "acceleration" and "deceleration" or an embodiment of being capable of detecting only one of the "acceleration" and "deceleration".

The sliding-amount determining unit 5 determines that a slide has occurred when outputs of the velocity-difference detecting unit 3 and the deceleration calculating unit 4 exceed predetermined values set in advance and outputs a sliding amount 5D. The above mentioned predetermined values may be set arbitrary.

The load compensating unit 13 is provided at each carriage, detects a weight of the front and rear carriages for every vehicle, and outputs a load compensation signal 13D corresponding to a change in load during braking (a load of the front carriage in a traveling direction of a train is larger than that of the rear carriage). For example, when a brake command 12D is outputted, the load compensating unit 13 mounted on the front carriage in the traveling direction (a first load compensating unit) outputs a load compensation signal corresponding to a vehicle weight acting on the corresponding carriage (a first load compensation signal). When the brake command 12D is outputted, the load compensating unit 13 mounted on the rear carriage in a traveling direction of a train (a second load compensating unit) outputs a load compensation signal corresponding to a vehicle weight acting on the corresponding carriage (a second load compensation signal).

When the brake command 12D is outputted from the brake command unit 12 or the load compensation signal 13D is outputted from the load compensating unit 13, the brake-cylinder-pressure calculating unit 6 calculates a pressure control signal 8D based on the sliding amount 5D outputted from the sliding-amount determining unit 5 and controls the electromagnetic valve unit 8 of the sliding wheel 15 to control re-adhesion of the sliding wheel 15. While the brake-cylinder-pressure calculating unit 6 is mentioned as an example of a unit that fetches the brake command 12D or the load compensation signal 13D, the present invention is not limited thereto.

For example, when a slide occurs in the rear carriage in the traveling direction of a train in one vehicle, the slide control unit 100 calculates a slide control value corresponding to the second load compensation signal 13D described above and the pressure control signal 8D obtained using the first load compensation signal 13D and the sliding amount 5D. The slide control unit 100 adds the slide control value corresponding to the second load compensation signal 13D to the pressure control signal 8D corresponding to the first load compensation signal 13D. As a result, not only a signal 9D indicating a brake cylinder pressure of the sliding wheel 15 of the rear carriage (hereinafter, simply "brake cylinder pressure") may be reduced and the wheel 15 may be re-adhered, but also the brake cylinder pressure 9D of the wheel 15 of the front carriage that is not sliding may be increased and a brake force may be used effectively in the entire vehicle.

The brake command unit 12 outputs the brake command 12D for obtaining predetermined deceleration. The output unit 7 outputs a control signal outputted from the brake-cylinder-pressure calculating unit 6 to the electromagnetic valve unit 8.

The electromagnetic valve unit 8 includes a supply valve that supplies supplied compressed air to the brake cylinder and an exhaust valve that adjusts a pressure of the supplied compressed air and converts a control signal outputted from the brake-cylinder-pressure calculating unit 6 into compressed air of a predetermined pressure (the pressure control signal 8D). The electromagnetic valve unit 8 exhausts or supplies the compressed air to be supplied to the relay valve 9 according to a slide state of the wheel 15. For example, when the wheel 15 slides, the compressed air supplied to the relay valve 9 is exhausted, so that the brake cylinder pressure 9D may be reduced and thus the wheel 15 may be re-adhered.

The relay valve 9 amplifies the pressure control signal 8D, supplied from the electromagnetic valve unit 8, to a predetermined pressure. An original air tank (not shown) is connected to the relay valve 9. Because the compressed air is reserved in the original air tank, the relay valve 9 amplifies the pressure control signal 8D to generate a brake cylinder pressure 9D for driving the brake cylinder 10.

The pressure sensor 11 detects the brake cylinder pressure 9D (or the pressure control signal 8D), generates a feedback command 11D based on the brake cylinder pressure 9D (or the pressure control signal 8D), and feeds back the feedback command 11D to the brake-cylinder-pressure calculating unit 6. Although the brake-cylinder-pressure calculating unit 6 is mentioned as an example of a unit that fetches the brake cylinder pressure 9D (or the pressure control signal 8D), the present invention is not limited thereto.

The brake cylinder 10 presses the brake shoe 14 according to a magnitude of the brake cylinder pressure 9D. The brake cylinder pressure 9D may be calculated by a formula $B=F/(k*f)$ (B: brake cylinder pressure 9D, F: brake force, k: constant, f: friction coefficient of the brake shoe 14). When the friction coefficient is fixed, a brake force acting on the brake shoe 14 varies in proportion to the value of the brake cylinder pressure 9D.

The relay valve 9 is shared by the front and rear carriages in conventional train slide control devices. That is, because the brake cylinder pressure 9D of each vehicle is controlled by the relay valve 9, an air quantity in the relay valve 9 is increased and thus the probability that hunting occurs is high. When the hunting occurs, the compressed air supplied to the relay valve 9 is not similar to the compressed air outputted from the relay valve 9 and a response of the brake cylinder pressure 9D is inferior. Accordingly, when the brake cylinder pressure 9D is fed back to the brake-cylinder-pressure calculating unit 6 via the pressure sensor 11, an accurate pressure control signal 8D is hard to be obtained.

In the train slide control device 200 according to the first embodiment, the relay valve 9 is made compact and disposed adjacent to each of the carriages. An air capacity within the relay valve 9 is reduced as compared to conventional cases. By correcting hysteresis of the relay valve 9 using the pressure sensor 11, the relay valve 9 may be adjusted finely to have a predetermined pressure. Hunting is thus reduced and the response of the brake cylinder pressure 9D is improved.

The slide control unit 100 uses the brake-cylinder-pressure calculating unit 6 as well as the velocity signal 1D to generate the brake cylinder pressure 9D.

The slide control unit 100 may use three modes, which are a "supply" mode, a "maintaining" mode, and a "release" mode for feedback control. In the "supply" mode, compressed air may be supplied. In the "maintaining" mode, supply and exhaust of the compressed air are stopped and a service brake may be maintained at a certain state. In the "release" mode, the compressed air may be exhausted.

Figure 2:
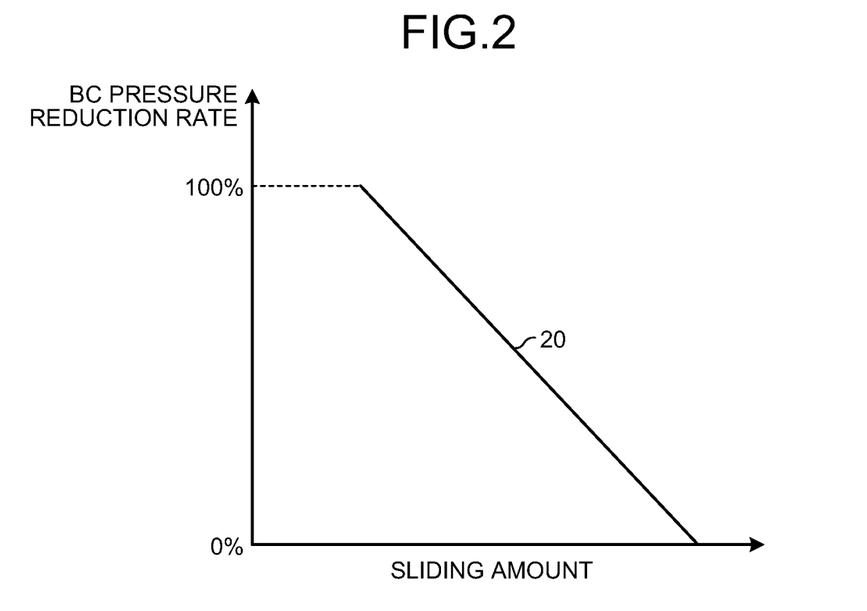
FIG. 2 is an example of a BC-pressure reduction-rate pattern.

FIG. 2 is an example of a BC-pressure reduction-rate pattern. A BC-pressure reduction-rate pattern 20 indicated by a solid line and a broken line is set in the brake-cylinder-pressure calculating unit 6 in advance for continuously deriving a BC-pressure reduction rate corresponding to the sliding amount 5D outputted by the sliding-amount determining unit 5. For example, when a slide occurs, the sliding-amount determining unit 5 calculates the sliding amount 5D. The brake-cylinder-pressure calculating unit 6 refers to the BC-pressure reduction-rate pattern 20 for the sliding amount 5D. Thus the brake-cylinder-pressure calculating unit 6 calculates the BC-pressure reduction rate corresponding to the sliding amount 5D.

Further, the brake-cylinder-pressure calculating unit 6 derives "BC pressure reduction" corresponding to the BC-pressure reduction rate, subtracts "reduction of the BC pressure 9D (the pressure control signal 8D)" from "current BC pressure 9D (the pressure control signal 8D)" to calculate "target (re-adhesion) BC pressure 9D (the pressure control signal 8D)".

Because the train slide control device 200 can feed back the BC pressure 9D to the brake-cylinder-pressure calculating unit 6, the BC pressure 9D may be repeatedly calculated to approximate the target BC pressure 9D. The electromagnetic valve unit 8 may be operated continuously according to the repeatedly calculated BC pressure 9D. The BC-pressure reduction-rate pattern 20 is not limited to the pattern illustrated in FIG. 2 (a slope of the linear solid line). The BC-pressure reduction-rate pattern 20 may be set for every brake shoe 14.

Figure 4:
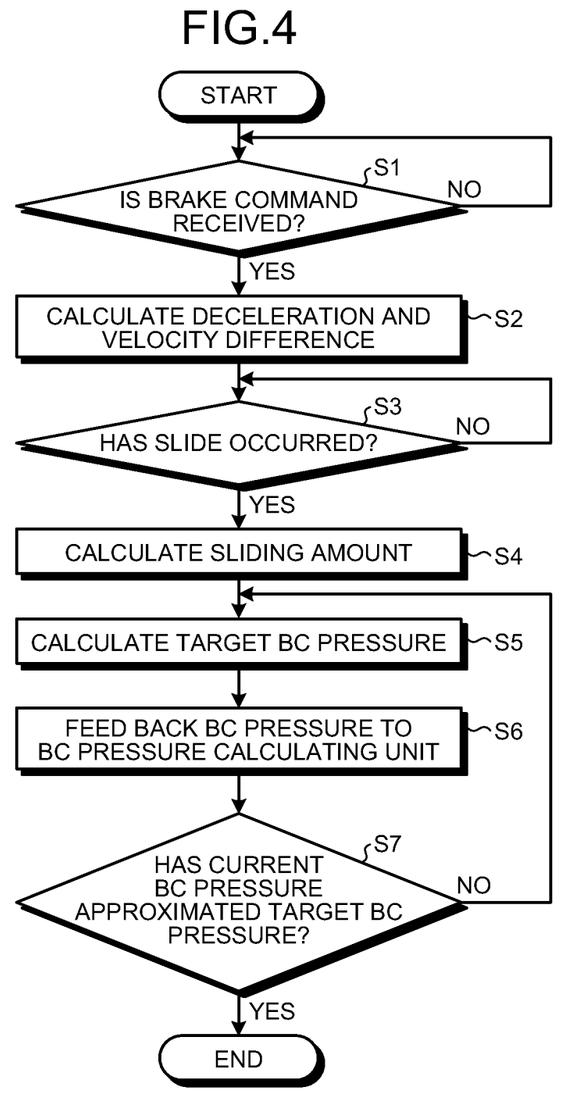
FIG. 4 is a flowchart of an example of a flow of determining a brake cylinder pressure.

FIG. 4 is a flowchart of an example of a flow of determining a brake cylinder pressure. The velocity-difference detecting unit 3 or the deceleration calculating unit 4 receives the velocity signal 1D from the velocity sensors 1a to 1d and calculates the velocity difference 3D of each wheel 15. When the brake-cylinder-pressure calculating unit 6 receives the brake command 12D (YES at Step S1), the velocity-difference detecting unit 3 and the deceleration calculating unit 4 calculate the velocity difference 3D and the deceleration 4D, respectively (Step S2). When the sliding-amount determining unit 5 determines that a slide has occurred (YES at Step S3), the sliding-amount determining unit 5 calculates the sliding amount 5D (Step S4) and outputs the calculated sliding amount 5D to the brake-cylinder-pressure calculating unit 6. The brake-cylinder-pressure calculating unit 6 calculates the target BC pressure 9D based on the sliding amount 5D transmitted from the sliding-amount determining unit 5 (Step S5). The pressure sensor 11 feeds back the BC pressure 9D to the brake-cylinder-pressure calculating unit 6 (Step S6). The brake-cylinder-pressure calculating unit 6 terminates slide control when the current BC pressure 9D has approximated the target BC pressure 9D (YES at Step S7).

When the brake-cylinder-pressure calculating unit 6 does not receive the brake command 12D (NO at Step S1), the velocity-difference detecting unit 3 and the deceleration calculating unit 4 calculate neither the velocity difference 3D nor the deceleration 4D. When a slide has not occurred (NO at Step S3), the sliding-amount determining unit 5 does not calculate the sliding amount 5D.

When the current BC pressure 9D (the pressure control signal 8D) does not approximate the target BC pressure 9D (the pressure control signal 8D) (NO at Step S7), the brake-cylinder-pressure calculating unit 6 repeats processes subsequent to Step S5 until the current BC pressure 9D approximates the target BC pressure 9D (the pressure control signal 8D) and continues the slide control.

As described above, according to the train slide control device 200 of the first embodiment, the relay valve 9 is disposed adjacent to a carriage and the brake cylinder pressure 9D (or the pressure control signal 8D) with reduced hunting is fed back to the brake-cylinder-pressure calculating unit 6. A time lag between the velocity difference 3D of each wheel 15 is detected, as a basic brake is operated, and the slide control is performed is thus eliminated and the response of a brake force may be improved. Because the slide control may be continuously performed using the BC-pressure reduction-rate pattern 20, re-slide may be reduced and an extension of a braking distance may be prevented as compared to the conventional train slide control devices. Further, because re-slide is reduced, generation of wheel flat on each wheel 15 (a flat spot generated when the wheel 15 is locked) is reduced and the man-hour for cutting the wheel 15, noises and vibrations when a train travels, and deterioration in riding comfortability may be suppressed. Because cutting of the wheel 15 is reduced, the longevity of the wheel 15 may be extended. Further, when the brake cylinder pressure 9D continues to be "0" during feedback control, the electromagnetic valve unit 8 is forced to be in a release or supply state. Futile operations of the electromagnetic valve unit 8 are thus eliminated and the longevity of the electromagnetic valve unit 8 may be extended.

Second Embodiment

The train slide control device 200 according to a second embodiment is configured so as to calculate a BC-pressure reduction rate for the wheel 15 according to the number of slides of the wheel 15. Because a configuration of the train slide control device 200 and a flow of determining the brake cylinder pressure 9D are identical to those illustrated in FIGS. 1 and 4 in the first embodiment, descriptions thereof will be omitted.

Figure 3:
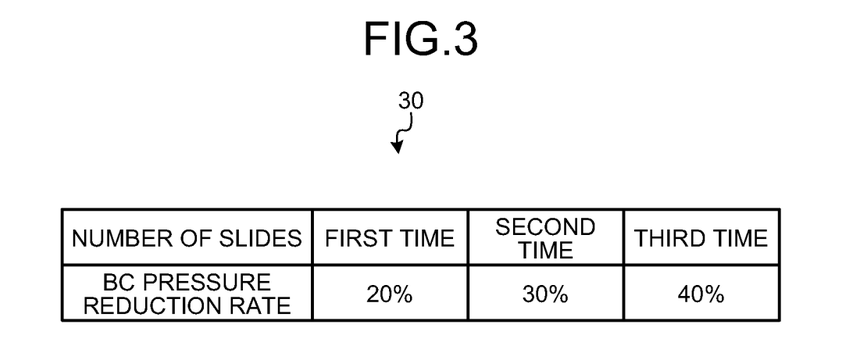
FIG. 3 is an example of a BC-pressure reduction-rate table.

FIG. 3 is an example of a BC-pressure reduction-rate table. A BC-pressure reduction-rate table 30 illustrated in FIG. 3 is constituted by an item indicating the number of slides of the wheel 15 and an item indicating the BC-pressure reduction rate.

Although the first to third numbers of slides are indicated as an example of the number of slides in the item of the number of slides, the present invention is not limited thereto and the number of slides may be four or more, for example. Values of the BC-pressure reduction rate corresponding to the respective numbers of slides are indicated in the item of the BC-pressure reduction rate. For example, when a first slide occurs, the BC-pressure reduction rate is set to 20% and thus the brake-cylinder-pressure calculating unit 6 provides "reduction of the BC pressure 9D" corresponding to "20%" of the BC-pressure reduction rate and subtracts this "reduction of the BC pressure 9D" from the "current BC pressure 9D". Values of the BC-pressure reduction rate are merely an example and the present invention is not limited thereto. The BC-pressure reduction rate may be set arbitrarily. For example, a step of the BC-pressure reduction rate may be set more finely. The BC-pressure reduction-rate table 30 may be set for every brake shoe 14.

Because the train slide control device 200 can feed back the BC pressure 9D (the pressure control signal 8D) to the brake-cylinder-pressure calculating unit 6, when a second slide occurs, the BC pressure 9D may be calculated again. That is, the number of slides is incremented until the slide of the wheel 15 does not occur and the calculation mentioned above may be repeatedly performed. The slide control may be performed by combining the BC-pressure reduction-rate pattern 20 according to the first embodiment and the BC-pressure reduction-rate table 30.

As described above, the train slide control device 200 according to the second embodiment can perform the slide control continuously by using the BC-pressure reduction-rate table 30. Accordingly, as compared to conventional train slide control devices, re-slide may be reduced and extension of a braking distance may be prevented according to the second embodiment. Further, because re-slide may be reduced, generation of flat wheel of each wheel 15 is reduced and the man-hour for cutting the wheel 15, noises and vibrations while a train travels, and a deterioration in riding comfortability may be suppressed. Because the man-hour for cutting of the wheel 15 is reduced, the longevity of the wheel 15 may be extended. Further, when the brake cylinder pressure 9D continues to be "0" during feedback control, the electromagnetic valve unit 8 is forced to be in a release or supply state. As a result, futile operations of the electromagnetic valve unit 8 are eliminated and the longevity of the electromagnetic valve unit 8 may be extended.

Third Embodiment

A train slide control device according to a third embodiment is configured so as to correct maximum deceleration by deceleration calculated based on a deceleration sensor and feed back a feedback command generated based on a pressure control signal to a brake-cylinder-pressure calculating unit that further improves the precision of slide control. Parts identical to those in the first and second embodiments are denoted with like reference numerals and descriptions thereof will be omitted.

Figure 5:
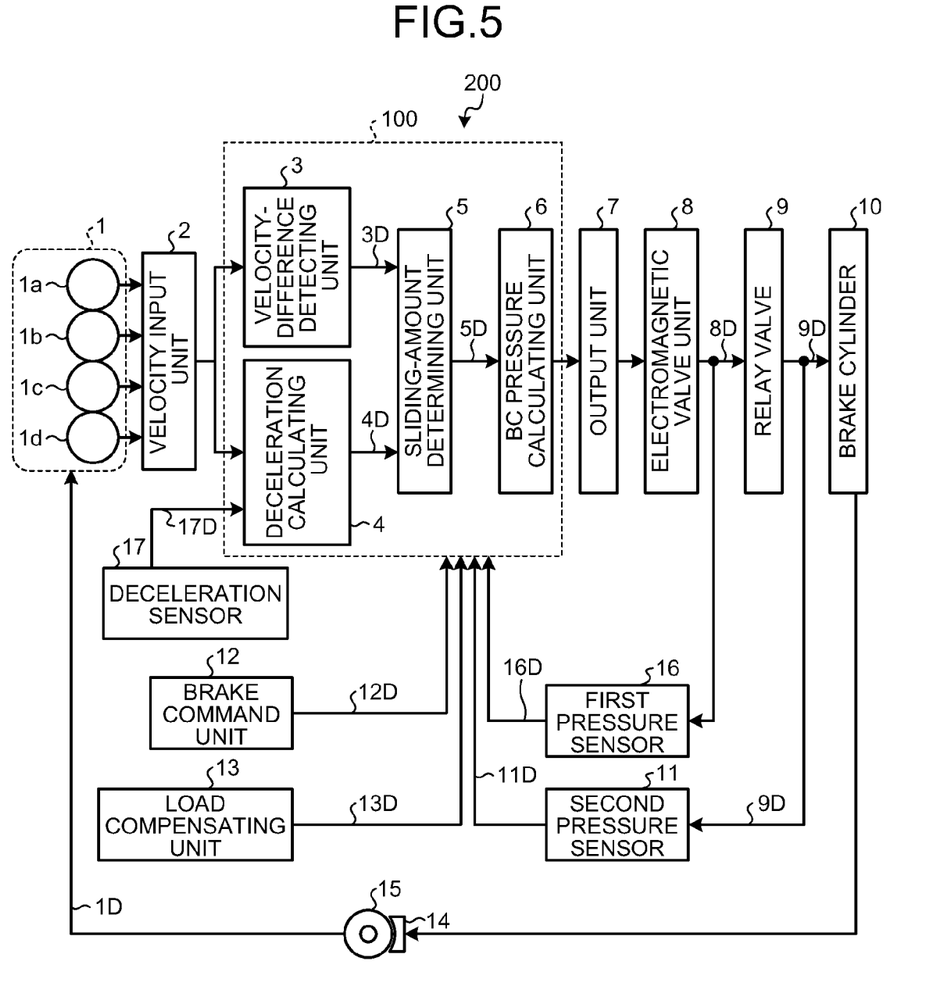
FIG. 5 is an example of a configuration of a train slide control device according to a third embodiment.

FIG. 5 is an example of a configuration of the train slide control device according to the third embodiment. The train slide control device 200 illustrated in FIG. 5 includes a deceleration sensor 17 and a first pressure sensor 16 in addition to the constituent elements of the train slide control device illustrated in FIG. 1.

The deceleration calculating unit 4 calculates deceleration of a vehicle based on a deceleration sensor output 17D. Further, the deceleration calculating unit 4 further corrects maximum deceleration by using the calculated deceleration as positive. This correction is effective for correction when all axes slide. The sliding-amount determining unit 5 determines that a slide has occurred when the corrected deceleration 4D exceeds a predetermined value set in advance and outputs the sliding amount 5D. The brake-cylinder-pressure calculating unit 6 calculates the pressure control signal 8D based on the sliding amount 5D when the brake command 12D is outputted from the brake command unit 12 or the load compensation signal 13D is outputted from the load compensating unit 13, and the brake-cylinder-pressure calculating unit 6 controls the electromagnetic valve unit 8 of the sliding wheel 15.

The first pressure sensor 16 detects the signal (the pressure control signal) 8D that indicates a pressure of compressed air which is outputted from the electromagnetic valve unit 8. The first pressure sensor 16 generates a feedback command 16D based on the pressure control signal 8D, and feeds back the feedback command 16D to the brake-cylinder-pressure calculating unit 6. Although the brake-cylinder-pressure calculating unit 6 is illustrated as a place to which the pressure control signal 8D is fed back, the present invention is not limited thereto.

As described above, in the conventional train slide control devices, the probability that hunting occurs is high. When hunting occurs, an accurate pressure control signal 8D is hardly calculated even when the brake cylinder pressure 9D is fed back to the brake-cylinder-pressure calculating unit 6 via the first pressure sensor 16 because the response of the brake cylinder pressure 9D is inferior.

Similarly to the first embodiment, the train slide control device 200 according to the third embodiment is configured such that the relay valve 9 is made compact and the relay valve 9 is disposed adjacent to each carriage. The air capacity within the relay valve 9 is thus reduced as compared to the conventional cases. By correcting hysteresis of the relay valve 9 using the first pressure sensor 16, the relay valve is finely adjusted to a predetermined pressure. As described above, three modes are used in the slide control unit 100. For deceleration that is one of the conditions for switching the three modes, the deceleration 4D corrected by the deceleration sensor 17 is used.

An operation of the train slide control device 200 according to the third embodiment is described below with reference to FIG. 4 described above. The velocity-difference detecting unit 3 or the deceleration calculating unit 4 receives the velocity signal 1D from the velocity sensors 1a to 1d and calculates the velocity difference 3D and the like of each wheel 15. When the brake-cylinder-pressure calculating unit 6 receives the brake command 12D (YES at Step S1), the velocity-difference detecting unit 3 and the deceleration calculating unit 4 calculate the velocity difference 3D and the deceleration 4D, respectively (Step S2). When the sliding-amount determining unit 5 determines that a slide has occurred (YES at Step S3), the sliding-amount determining unit 5 calculates the sliding amount 5D (Step S4) and outputs the sliding amount 5D to the brake-cylinder-pressure calculating unit 6. The brake-cylinder-pressure calculating unit 6 calculates the target BC pressure 9D based on the sliding amount 5D transmitted from the sliding-amount determining unit 5 (Step S5). The second pressure sensor 11 feeds back the BC pressure 9D to the brake-cylinder-pressure calculating unit 6 and the first pressure sensor 16 feeds back the pressure control signal 8D to the brake-cylinder-pressure calculating unit 6 (Step S6). The brake-cylinder-pressure calculating unit 6 terminates slide control when the current BC pressure 9D approximates the target BC pressure 9D (YES at Step S7). As conditions for resetting the slide control, the velocity difference 3D and the deceleration 4D corrected by the deceleration sensor 17 are used.

When the current BC pressure 9D does not approximate the target BC pressure 9D (NO at Step S7), the brake-cylinder-pressure calculating unit 6 repeats processes subsequent to Step S5 until the current BC pressure 9D approximates the target BC pressure 9D and continues the slide control.

As described above, the train slide control device 200 according to the third embodiment includes the deceleration sensor 17 and the first pressure sensor 16.

The deceleration calculating unit 4 corrects the maximum deceleration by using deceleration calculated based on the deceleration sensor 17D as positive. The first pressure sensor 16 feeds back the feedback command 16D generated based on the pressure control signal 8D to the brake-cylinder-pressure calculating unit 6, and thus the precision of the slide control may be improved. As a result, reduction of re-slide and prevention of extension of a braking distance may be further expected.

INDUSTRIAL APPLICABILITY

As described above, the train slide control device according to the present invention is useful as a train slide control device that adjusts a brake cylinder pressure to perform slide control of each wheel.

The invention claimed is:

1. A train slide control device comprising:
a slide control unit configured to control an electromagnetic valve unit and a relay valve;
the electromagnetic valve unit having a supply valve that supplies supplied compressed air, through the relay valve, to a brake cylinder and an exhaust valve that adjusts a pressure of the supplied compressed air;
the relay valve is configured to output a pressure of the brake cylinder according to the compressed air supplied from the electromagnetic valve unit; and
the slide control unit includes:
a velocity-difference detecting unit configured to detect a velocity difference of each wheel of a train, based on a velocity signal;
a deceleration calculating unit configured to calculate a deceleration of the train based on the velocity signal;
a sliding-amount determining unit configured to determine a sliding-amount of each wheel of the train based on the velocity difference and deceleration; and
a brake-cylinder-pressure calculating unit configured to calculate a pressure control signal for controlling a pressure of the brake cylinder based on:
the sliding-amount;
a brake command for obtaining a predetermined deceleration; and
a signal that indicates the pressure of the compressed air and pressure of the brake cylinder.

2. The train slide control device according to claim 1, wherein, when a slide has occurred, the slide control unit calculates the pressure control signal by using a value of a pressure of the brake cylinder as a re-adhesion value based on a signal indicating a pressure of the brake cylinder outputted from the relay valve.

3. The train slide control device according to claim 2, further comprising:
a first load compensating unit that is mounted on a front carriage in a traveling direction of a train and outputs a first load compensation signal corresponding to a train vehicle weight; and
a second load compensating unit that is mounted on a rear carriage in a traveling direction of a train and outputs a second load compensation signal corresponding to a train vehicle weight, wherein
when a slide has occurred in the rear carriage, the slide control unit adds a slide control value calculated by the second load compensation signal and the sliding amount to the pressure control signal corresponding to the first load compensation signal.

4. The train slide control device according to claim 1, further comprising:
a first load compensating unit that is mounted on a front carriage in a traveling direction of a train and outputs a first load compensation signal corresponding to a train vehicle weight; and
a second load compensating unit that is mounted on a rear carriage in a traveling direction of a train and outputs a second load compensation signal corresponding to a vehicle weight, wherein
when a slide has occurred in the rear carriage, the slide control unit adds a slide control value calculated by the second load compensation signal and the sliding amount to the pressure control signal corresponding to the first load compensation signal.

5. A train slide control device comprising:
a slide control unit configured to control an electromagnetic valve unit and a relay valve;
the electromagnetic valve unit having a supply valve that supplies supplied compressed air, through the relay valve, to a brake cylinder and an exhaust valve that adjusts a pressure of the supplied compressed air;
the relay valve is configured to output a pressure of the brake cylinder according to the compressed air supplied from the electromagnetic valve unit;
a deceleration sensor configured to detect a deceleration of a train; and
the slide control unit includes:
a velocity-difference detecting unit configured to detect a velocity difference of each wheel of a train based on a velocity signal;
a deceleration calculating unit configured to calculate the deceleration of the train based on the velocity signal;
a sliding-amount determining unit configured to determine a sliding-amount of each wheel of the train based on the velocity difference and the deceleration; and
a brake-cylinder-pressure calculating unit configured to calculate a pressure control signal based on the sliding-amount.

6. The train slide control device according to claim 5, wherein a brake-cylinder-pressure calculating unit calculates the pressure control signal based on the sliding amount, a brake command, a pressure of the compressed air, and a signal indicating the pressure of the brake cylinder.

7. The train slide control device according to claim 6, further comprising:
a first load compensating unit that is mounted on a front carriage in a traveling direction of a train and outputs a first load compensation signal corresponding to a train vehicle weight; and
a second load compensating unit that is mounted on a rear carriage in a traveling direction of a train and outputs a second load compensation signal corresponding to a train vehicle weight, wherein
when a slide has occurred in the rear carriage, the slide control unit adds a slide control value calculated by the second load compensation signal and the sliding amount to the pressure control signal corresponding to the first load compensation signal.

8. The train slide control device according to claim 5, wherein, when a slide has occurred, the slide control unit calculates the pressure control signal by using a value of a pressure of the brake cylinder as a re-adhesion value based on a signal indicating a pressure of the brake cylinder outputted from the relay valve.

9. The train slide control device according to claim 8, further comprising:
a first load compensating unit that is mounted on a front carriage in a traveling direction of a train and outputs a first load compensation signal corresponding to a train vehicle weight; and a second load compensating unit that is mounted on a rear carriage in a traveling direction of a train and outputs a second load compensation signal corresponding to a train vehicle weight, wherein when a slide has occurred in the rear carriage, the slide control unit adds a slide control value calculated by the second load compensation signal and the sliding amount to the pressure control signal corresponding to the first load compensation signal.

10. The train slide control device according to claim 5, further comprising:

a first load compensating unit that is mounted on a front carriage in a traveling direction of a train and outputs a first load compensation signal corresponding to a train vehicle weight; and a second load compensating unit that is mounted on a rear carriage in a traveling direction of a train and outputs a second load compensation signal corresponding to a train vehicle weight, wherein when a slide has occurred in the rear carriage, the slide control unit adds a slide control value calculated by the second load compensation signal and the sliding amount to the pressure control signal corresponding to the first load compensation signal.

11. A train slide control method applicable to a train slide control device including an electromagnetic valve unit having a supply valve that supplies supplied compressed air to a brake cylinder and an exhaust valve that adjusts a pressure of the supplied compressed air, and a relay valve that outputs a pressure of the brake cylinder according to the compressed air supplied from the electromagnetic valve unit, the train slide control method comprising:

a detecting step of detecting a velocity difference of each wheel of a train and deceleration of the train based on a velocity signal of each wheel of the train;

a first calculating step of calculating a sliding amount of each wheel of the train based on the velocity difference and the deceleration; and a second calculating step of calculating a pressure control signal based on the sliding amount, a brake command for obtaining predetermined deceleration, and a signal indicating a pressure of the brake cylinder.

12. The train slide control method according to claim 11, wherein at the second calculating step, the pressure control signal is calculated by determining a value of a pressure of the brake cylinder as a re-adhesion value using the signal indicating the pressure of the brake cylinder.

13. A train slide control method applicable to a train slide control device including an electromagnetic valve unit having a supply valve that supplies supplied compressed air to a brake cylinder and an exhaust valve that adjusts a pressure of the supplied compressed air, a relay valve that outputs a pressure of the brake cylinder according to the compressed air supplied from the electromagnetic valve unit, and a deceleration sensor that detects deceleration of a train, the train slide control method comprising;

a detecting step of detecting a velocity difference of each wheel of a train and a deceleration of the train based on a velocity signal of each wheel of the train and an output of the deceleration sensor;

a first calculating step of calculating a sliding amount of each wheel of the train based on the velocity difference and the deceleration; and a second calculating step of calculating a pressure control signal based on the sliding amount, a brake command for obtaining predetermined deceleration, a signal that is outputted from the electromagnetic valve unit and indicates a pressure of the compressed air, and a signal indicating a pressure of the brake cylinder.

14. The train slide control method according to claim 13, wherein at the second calculating step, the pressure control signal is calculated by determining a value of a pressure of the brake cylinder as a re-adhesion value using the signal indicating the pressure of the brake cylinder.

* * * * *